Dec. 28, 1926.                                                              1,611,917
S. W. JOHNSON
QUACK GRASS DIGGER
Filed March 14, 1925          2 Sheets-Sheet 1

Inventor
Stanley W. Johnson
By his Attorneys

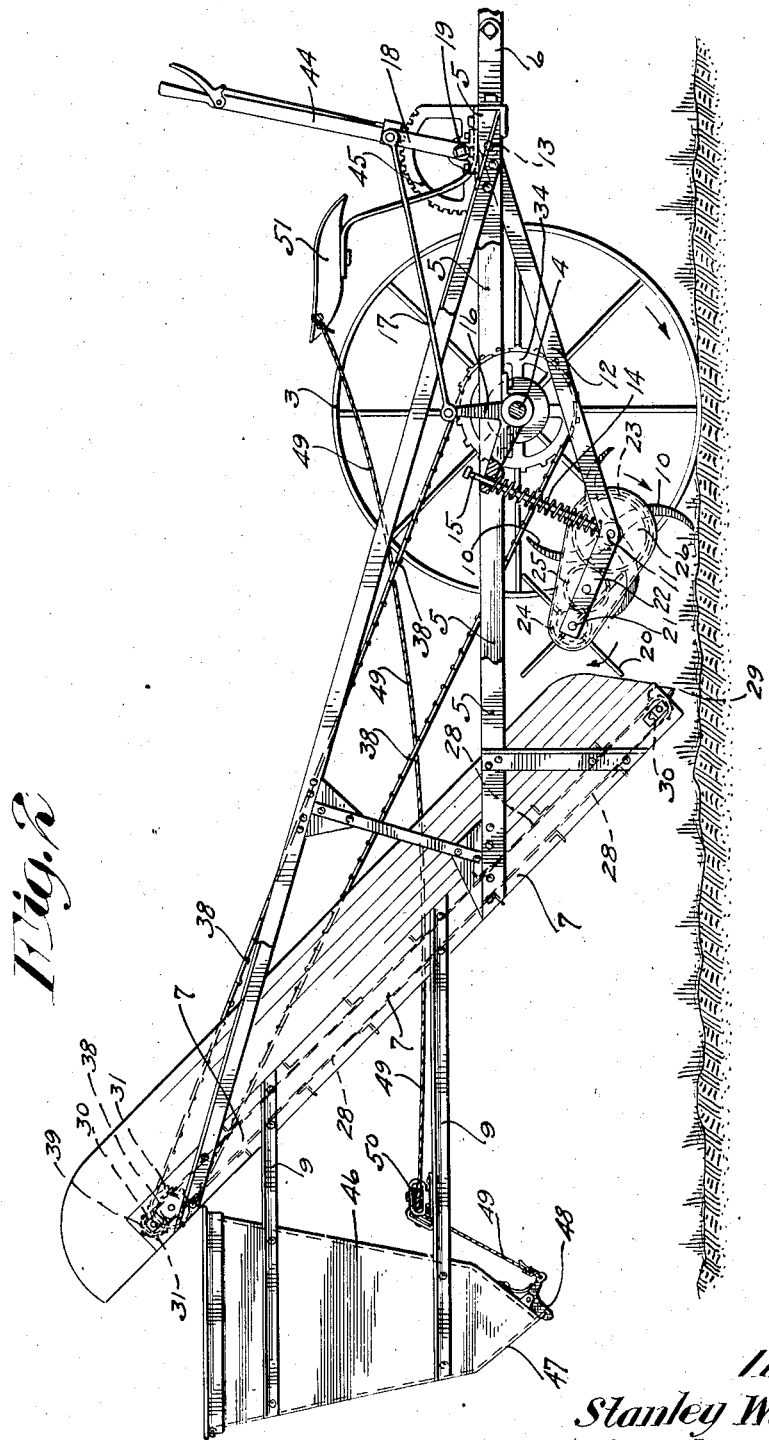

Patented Dec. 28, 1926.

1,611,917

UNITED STATES PATENT OFFICE.

STANLEY W. JOHNSON, OF KENNEDY, MINNESOTA.

QUACK-GRASS DIGGER.

Application filed March 14, 1925. Serial No. 15,509.

My invention relates to a quack grass digger and has for its object to improve the same in the several particulars hereinafter noted.

To the above end, the invention consists of the novel devices and combinations of devices hereinafter described and defined in the claims.

In the accompanying drawings, which illustrate the invention, like characters indicate like parts throughout the several views.

Referring to the drawings:

Fig. 2 is a right side elevation of the same, with some parts broken away.

Figure 1:
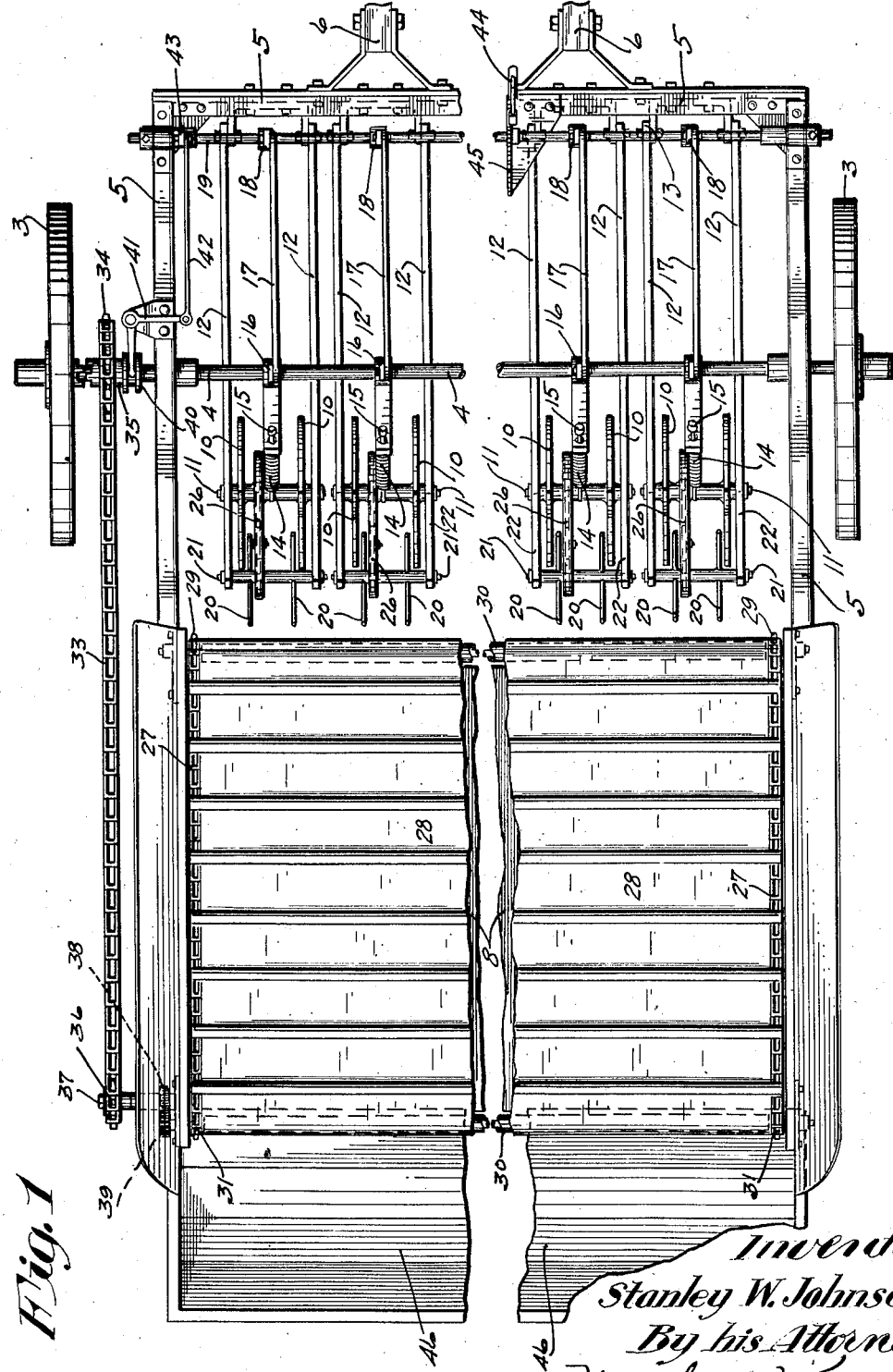
Fig. 1 is a fragmentary plan view of the quack grass digger.

The numeral 3 indicates a pair of wheels journaled on an axle 4 on which is supported a frame 5 having a pair of draft poles 6. Carried by the frame 5 at the rear thereof is an elevator frame 7 having a deck 8, and said elevator frame in turn carries a rearwardly projecting hopper frame 9.

The numeral 10 indicates a plurality of laterally spaced diggers, each of which is in the form of curved radially extended fingers on a hub. These diggers 10 are arranged in pairs, the hubs of which are loosely journaled on a short fixed shaft 11 secured in a pair of rearwardly and downwardly inclined arms 12. These pairs of arms 12 are pivoted at 13 to the front member of the frame 5 for independent vertical swinging movement. Each pair of diggers 10 is yieldingly pressed into the ground by a coiled spring 14 which encircles an upstanding headed rod 15 secured to the shaft 11 of said diggers by having in its lower end an eye which extends between the hubs of said diggers and through which said shaft extends. The upper end portion of the rod 15 extends loosely through an eye in one of the arms of a bell crank 16 pivoted to the axle 4 and against which the spring 14 reacts as a base of resistance. A link 17 connects the other arm of the bell crank 16 to a crank arm 18 on a rock shaft 19 journaled in bearings on the frame 5.

Co-operating with each pair of diggers 10 is a pair of co-operating combined strippers and kickers 20 in the form of radial fingers secured on a common hub loosely journaled on a fixed shaft 21 secured in rearwardly and upwardly inclined extensions 22 on the arms 12.

It will be noted that each pair of combined strippers and kickers work close to the respective pair of diggers 10. The diggers 10 are rotated in the direction of the arrow marked thereon in Fig. 2 by their contact with the ground, and the co-operating pair of combined strippers and kickers 20 is positively driven therefrom by a gear 23 on the hub of one of said diggers and a gear 24 on the hub of the respective pair of combined strippers and kickers by an idle intermediate gear 25 loosely journaled in a housing 26 for said gears.

As the quack grass, weeds and other vines are dug up by the diggers 10, the same are removed therefrom by the combined strippers and kickers 20 and thrown into an elevator comprising a pair of link belts 27 and an endless apron 28 having slats secured thereto. Said link belts 27 are arranged to run over idle sprockets 29 on a roller-equipped shaft 30 mounted in the elevator frame 7 and a pair of sprockets 31 on a roller-equipped shaft 32 journaled in said frame. The endless apron 28 runs over the roller-equipped shafts 30 and 32. The shaft 32 and, hence, the sprockets 31, are driven from the left-hand wheel 3 by a sprocket chain 33 which runs over a sprocket wheel 34 on the sliding member of a clutch 35 and a relatively small sprocket wheel 36 on a stub shaft 37 journaled in a bearing on the frame 7 and having a gear 38 which meshes with a gear 39 on the shaft 32. The other member of the clutch 35 is formed with the hub of the respective wheel 3.

The sliding member of the clutch 35 has a shipper collar 40 to which is connected a shipper lever 41 in the form of a bell crank pivoted to the frame 5 and connected by a link 42 to a crank arm 43 on the rock shaft 19. This rock shaft is operated by a lever 44 to which it is secured for co-operation with a latch segment 45 on the frame 5.

Mounted on the frame 7 is a hopper 46 having an open back and bottom section normally closed by a gravity-closed gate 47 hinged at its upper end to said hopper. This gate 47 is held closed by a spring-projected latch 48 that may be released by a cable 49 arranged to run over guide sheaves 50 on the frame and attached to a seat on the frame 5, in the vicinity of the latch lever 44.

From the above description, it is evident that by moving the latch lever 44 forward, the rock shaft 19 will be turned to raise the diggers 10 and combined strippers and kickers 20 through the connections 15, 16, 17 and 18. By moving the latch lever 44 rearward, the rock shaft 19 will be turned to lower the diggers 10 and combined strippers and kickers 20. This latter movement of the lever 44 places the spring 14 under tension so that the diggers 10 are pressed into the ground but are free to rise and fall by the movement of the rods 15 through the eyes in the bell cranks 16.

As previously stated, quack grass and other weeds stripped from the kickers 20 are thrown onto the elevators 27 and 28, carried upward thereon and deposited into the hopper 46. When the hopper 46 is full, the contents thereof may be dumped by drawing forward on the cable 49 to release the latch 48. To close the gate 47, it is only necessary to swing the gate 27 forward by the cable 49 to cause the spring latch 48 to operate and lock said gate closed. Simultaneously with the raising of the diggers 10 by the latch lever 44 and the several connections thereto, the clutch 35 is automatically thrown out of action through the connections 40, 41, 42 and 43 to stop the operation of the elevator 27—28. At the time the diggers 10 are lowered by the latch lever 44, the clutch 35 is automatically set to start the elevator 27—28.

The quack grass digger may be drawn by draft animals, or by a tractor attached to the poles 6.

What I claim is:

1. In a quack grass digger, the combination with a wheel-supported frame, of floating diggers carried by the frame and arranged to be rotated by their contact with the ground, an elevator on the frame, combined strippers and kickers carried with the diggers and arranged to strip quack grass from the diggers and deliver the same to the elevator means including a clutch for driving the elevator, and means for raising and lowering the diggers and the combined strippers and kickers and for throwing the clutch into and out of action.

2. In a quack grass digger, the combination with a wheel-supported frame, of pairs of diggers carried by the frame for independent floating movement, a spring operative on each pair of diggers for pressing the same into the ground, an elevator, a pair of combined strippers and kickers carried with each pair of diggers and arranged to strip quack grass from the diggers and deliver the same to the elevator, means for driving the elevator from one of the wheels including a clutch for connecting said means to one of the wheels, and means for simultaneously raising or lowering all of the diggers and combined strippers and kickers and for throwing said clutch into and out of action.

3. The structure defined in claim 2 in further combination with means for driving each pair of combined strippers and kickers from one of the diggers with which they co-operate.

In testimony whereof I affix my signature.

STANLEY W. JOHNSON.